(12) United States Patent
Atallah et al.

(10) Patent No.: US 9,013,081 B2
(45) Date of Patent: Apr. 21, 2015

(54) VARIABLE MAGNETIC GEARS

(75) Inventors: Kais Atallah, Sheffield (GB); Jan Jozef Rens, Sheffield (GB)

(73) Assignee: Magnomatics Limited, Sheffield (GB)

( * ) Notice: Subject to any disclaimer, the term of this patent is extended or adjusted under 35 U.S.C. 154(b) by 931 days.

(21) Appl. No.: 12/918,679

(22) PCT Filed: Feb. 20, 2009

(86) PCT No.: PCT/GB2009/000476
§ 371 (c)(1),
(2), (4) Date: Nov. 4, 2010

(87) PCT Pub. No.: WO2009/103993
PCT Pub. Date: Aug. 27, 2009

(65) Prior Publication Data
US 2011/0037333 A1  Feb. 17, 2011

(30) Foreign Application Priority Data
Feb. 21, 2008  (GB) .................................. 0803119.7

(51) Int. Cl.
*H02K 49/00* (2006.01)
*H02K 49/10* (2006.01)
*H02K 51/00* (2006.01)
*H02K 7/18* (2006.01)

(52) U.S. Cl.
CPC ............ *H02K 49/102* (2013.01); *H02K 7/1838* (2013.01); *H02K 51/00* (2013.01); *Y02E 10/725* (2013.01)

(58) Field of Classification Search
CPC .............................. H02K 49/102; H02K 51/00
USPC .................................... 310/103, 104, 114, 98
See application file for complete search history.

(56) References Cited

U.S. PATENT DOCUMENTS

| | | | |
|---|---|---|---|
| 2,722,617 A | 11/1955 | Meyer et al. | |
| 4,713,570 A * | 12/1987 | Mastromattei | ................ 310/181 |
| 5,633,555 A * | 5/1997 | Ackermann et al. | ......... 310/75 D |
| 6,336,603 B1 * | 1/2002 | Karkos et al. | .............. 241/101.2 |
| 7,791,235 B2 | 9/2010 | Kern et al. | |
| 8,482,171 B2 * | 7/2013 | Edwards | ..................... 310/68 C |
| 8,810,097 B2 * | 8/2014 | Edwards | ....................... 310/103 |
| 2003/0201647 A1 * | 10/2003 | Makino et al. | .................. 290/55 |
| 2007/0069521 A1 * | 3/2007 | Jabaji et al. | ................. 290/40 C |

(Continued)

FOREIGN PATENT DOCUMENTS

| | | |
|---|---|---|
| DE | 3814455 | 11/1989 |
| DE | 10027360 | 12/2000 |

(Continued)

OTHER PUBLICATIONS

European Patent Application No. 13160951.3: Extended European Search Report dated Sep. 3, 2013, 4 pages.

*Primary Examiner* — Terrance Kenerly
(74) *Attorney, Agent, or Firm* — Baker & Hostetler LLP

(57) ABSTRACT

A magnetic gear comprising: a first movable member having a first set of magnetic poles, a second movable member having a second set of magnetic poles, and a third movable member having a set of pole pieces; wherein the first and second members have magnetic poles at different spacings and the pole pieces are arranged to modulate the magnetic field acting between the magnetic poles, and control means arranged to control rotation of one of the members so as to vary the gear ratio between the other two members.

9 Claims, 9 Drawing Sheets

(56) References Cited

U.S. PATENT DOCUMENTS

| | | | |
|---|---|---|---|
| 2007/0090707 A1* | 4/2007 | Moriya et al. | 310/113 |
| 2007/0096574 A1 | 5/2007 | Romagny et al. | |
| 2007/0108865 A1* | 5/2007 | Jansen et al. | 310/266 |
| 2007/0125578 A1 | 6/2007 | McDonald et al. | |
| 2008/0054643 A1* | 3/2008 | Nitzpon et al. | 290/44 |
| 2008/0149445 A1* | 6/2008 | Kern et al. | 192/3.56 |
| 2008/0243322 A1* | 10/2008 | Nobumoto et al. | 701/22 |
| 2011/0121673 A1* | 5/2011 | Edwards | 310/103 |
| 2011/0234034 A1* | 9/2011 | Edwards | 310/94 |
| 2014/0217743 A1* | 8/2014 | Sugita et al. | 290/55 |
| 2014/0306566 A1* | 10/2014 | Edwards | 310/103 |

FOREIGN PATENT DOCUMENTS

| | | | | |
|---|---|---|---|---|
| EP | 1843454 | | 10/2007 | |
| GB | 2437568 | | 10/2007 | |
| WO | WO2007125284 | * | 11/2007 | H02K 16/02 |

\* cited by examiner

VARIABLE MAGNETIC GEARS

FIELD OF THE INVENTION

The present invention relates to magnetic gears, and in particular to the control of the gear ratio of magnetic gears.

BACKGROUND TO THE INVENTION

Magnetic gears are known in which input and output rotors are provided with respective sets of magnetic pole pairs at different spacings, and a set of ferro-magnetic pole pieces is arranged between the input and output rotors to modulate the magnetic field and allow the input rotor to drive the output rotor with a gear ratio which depends on the ratio of the spacings of the two sets of magnetic poles and the spacing of the pole pieces.

SUMMARY OF THE INVENTION

The present invention provides a magnetic gear comprising: a first movable member having a first set of magnetic poles, a second movable member having a second set of magnetic poles, and a third movable member having a set of pole pieces; wherein the first and second members have magnetic poles at different spacings and the pole pieces are arranged to modulate the magnetic field acting between the magnetic poles, and control means arranged to control rotation of one of the members so as to vary the gear ratio between the other two members.

The movable members may comprise rotors or, in a linear system, translators.

The present invention further provides a power generation system comprising an input member, a generator, and a magnetic gear coupling the input member to the generator, wherein the magnetic gear is a gear according to the invention.

The present invention further provides a power train system comprising a prime mover, a load, and a magnetic gear coupling the prime mover to the load, wherein the magnetic gear is a gear according to the invention.

The present invention further provides a power train system comprising an engine, an output member, a magnetic gear connecting the engine to the output member, an energy storage system, and control means arranged to control the flow of power from the output member to the energy storage system and from the energy storage system to the output member, wherein the magnetic gear comprises a first rotor having a first set of magnetic poles, a second rotor having a second set of magnetic poles, and a third rotor having a set of pole pieces, the first and second rotors have different numbers of magnetic poles, the pole pieces are arranged to modulate the magnetic field acting between the magnetic poles, and the control means is arranged to control rotation of one of the rotors so as to vary the gear ratio between the other two rotors.

BRIEF DESCRIPTION OF THE DRAWINGS

Referring to FIGS. 1 and 2, a known rotary magnetic gear 100 comprises a first or inner rotor 102, a second or outer rotor 104 having a common axis of rotation with the first rotor 102, and a number of pole pieces 106 of ferromagnetic material supported between the rotors 102, 104. The first rotor 102 comprises a support 108 carrying a first set of permanent magnets 110, arranged with their north and south poles at their radially inner and outer ends, and orientated with alternating polarity so that each of the magnets 110 has its poles facing in the opposite direction to the magnets on either side of it. In this embodiment, the first rotor 102 comprises eight permanent magnets, or four pole-pairs, arranged to produce a spatially varying magnetic field. The second rotor 104 comprises a support 112 carrying a second set of permanent magnets 114, again arranged with their poles facing radially inwards and outwards, and with alternating polarity. The second rotor 104 comprises 46 permanent magnets or 23 pole-pairs arranged to produce a spatially varying field. The first and second sets of permanent magnets therefore include different numbers of magnets. Accordingly, without any modulation of the magnetic fields they produce, there would be little or no useful magnetic coupling or interaction between the two sets of permanents magnets 110 and 114 such that rotation of one rotor would not cause rotation of the other rotor.

Figure 1:
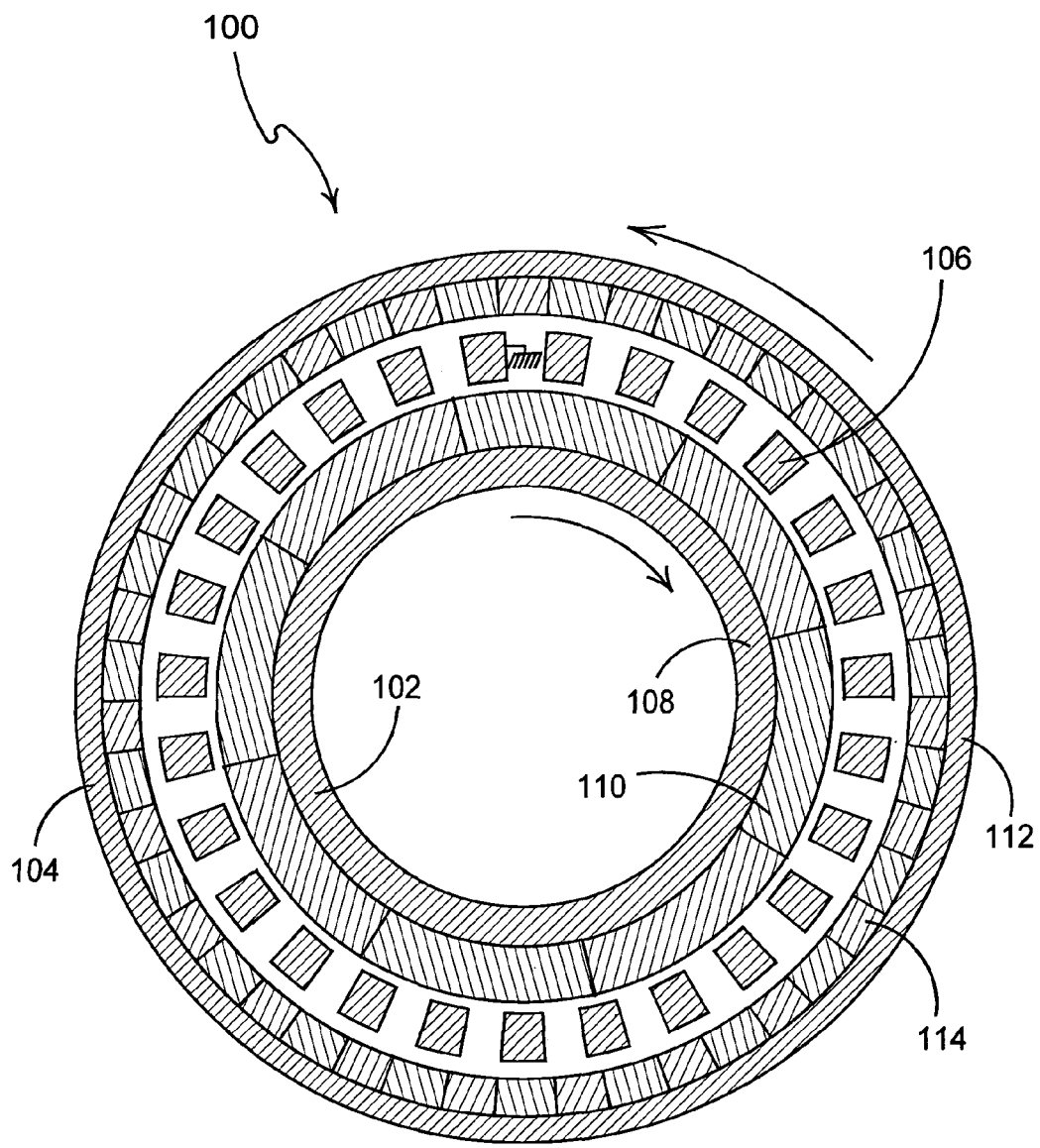
FIG. 1 is a schematic section through a known rotary magnetic gearing system.
Figure 2:
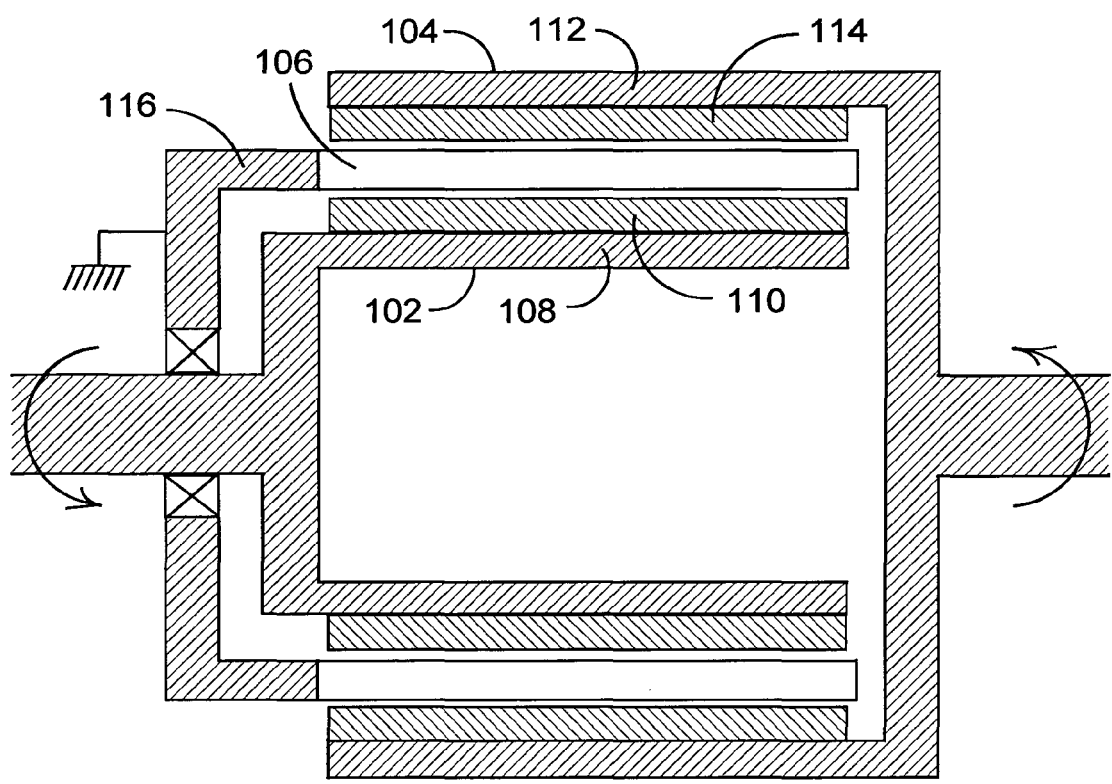
FIG. 2 is a longitudinal section through the gearing system of FIG. 1.

The pole pieces 106, which are supported in a cylindrical non-magnetic support 116, are used to control the way in which the fields of the permanent magnets 110 and 114 interact. The pole pieces 106 modulate the magnetic fields of the permanent magnets 110 and 114 so that they interact to the extent that rotation of one rotor will induce rotation of the other rotor in a geared manner. The number of pole pieces is chosen to be equal to the sum of the number of pole-pairs of the two sets of permanent magnets. Rotation of the first rotor 102 at a speed $\omega_1$, will induce rotation of the second rotor 104 at a speed $\omega_2$ where $\chi_1 > \omega_2$. The ratio between the speeds of rotation $\omega_1$ and $\omega_2$, i.e. the gearing ratio of the coupling, is equal to the ratio between the numbers of pole pairs of the magnets 110 and 114 on the first and second rotors 102, 104. The gear can operate in reverse, so that rotation of the second rotor 104 will cause rotation of the first rotor at a higher speed.

Figure 3:
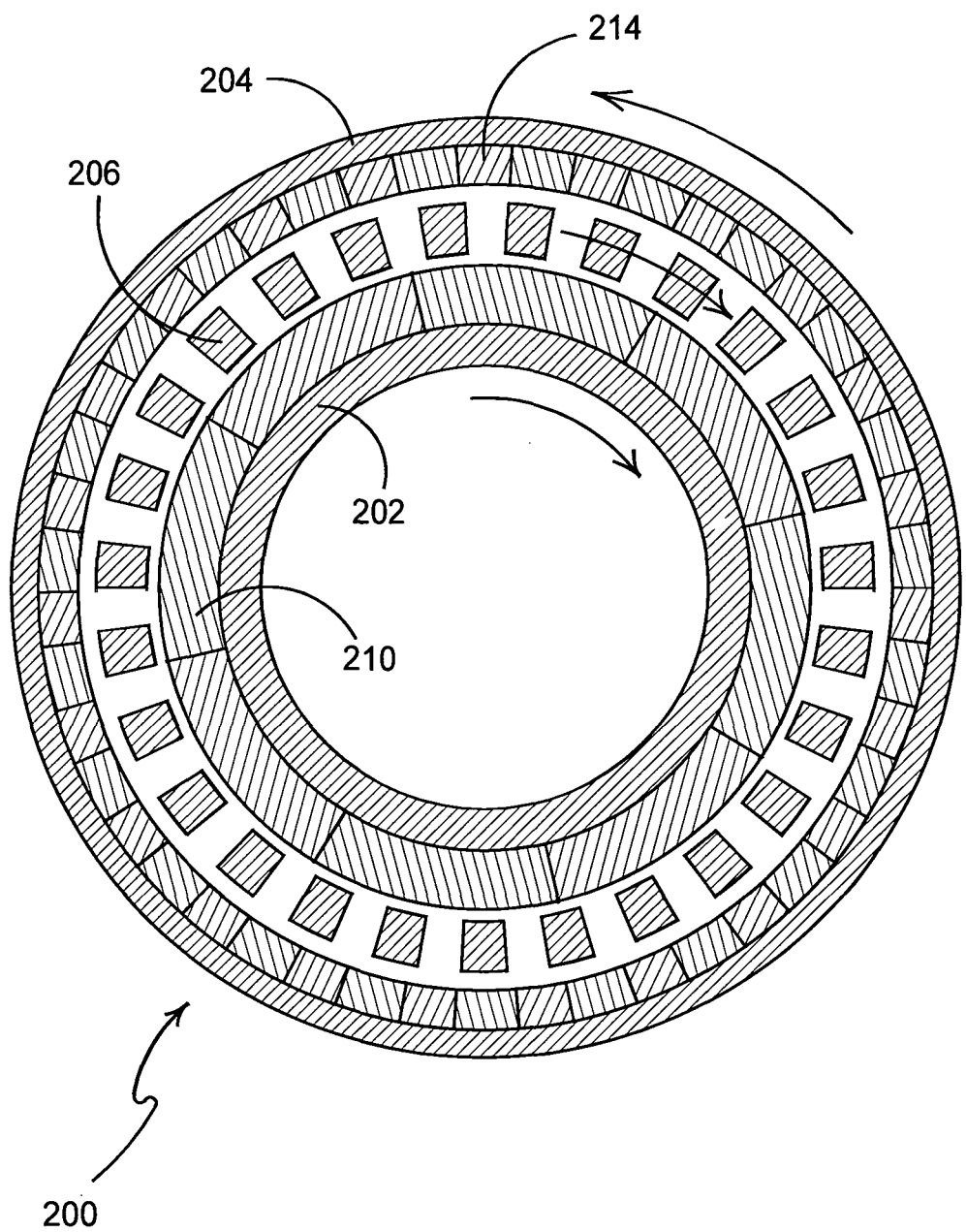
FIG. 3 is a cross sectional view of a drive coupling according to a first embodiment of the invention.
Figure 4:
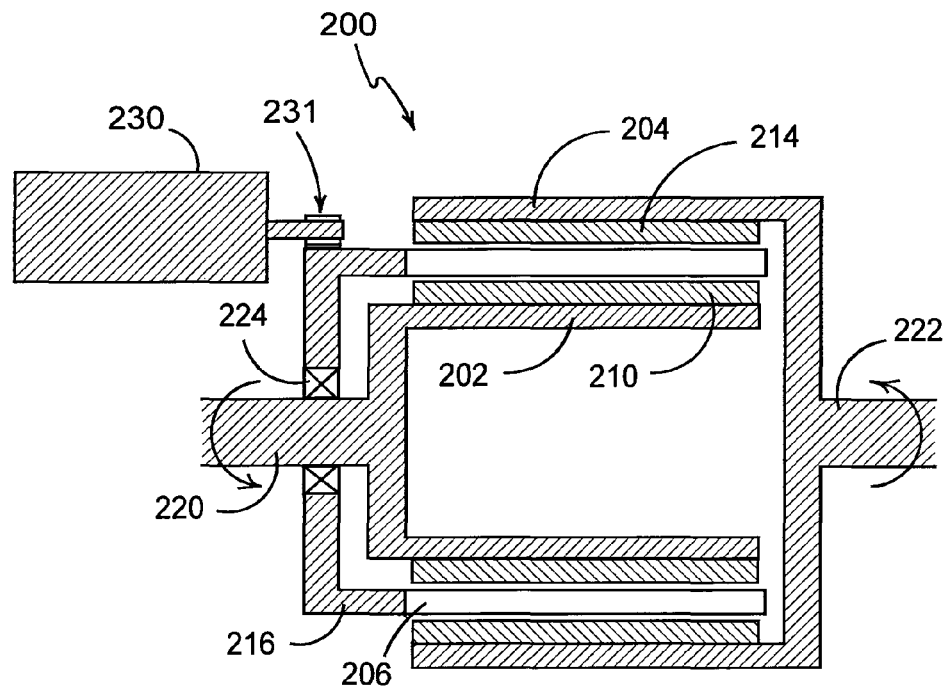
FIG. 4 is a longitudinal section through the drive coupling of FIG. 3.

Referring to FIGS. 3 and 4, in a first embodiment of the invention a magnetic gear 200 comprises three coaxial rotors: a cylindrical inner rotor 202 carrying a first set of magnets 210 providing a first set of magnetic pole pairs, a cylindrical outer rotor 204 carrying a second set of magnets 214 providing a second set of pole pairs, and a third cylindrical rotor 216 located radially between the inner and outer rotors 202, 204, which carries the set of pole pieces 206. The magnets 210, 214 and pole pieces 206 are spaced as in the coupling of FIG. 1. Referring, to FIG. 4, the inner rotor 202 is supported on an input shaft 220 so as to be rotatable therewith, and the outer rotor 204 is supported on an output shaft 222 so as to be rotatable therewith. The pole piece rotor 216 is rotatably supported on the input shaft 220 by means of a bearing 224. The third rotor 216 is therefore rotatable relative to, and independently of, the inner and outer rotors 202, 204. A drive motor 230 is drivingly connected by a mechanical transmission 231 to the pole piece rotor 216 so that it can rotate the pole piece rotor 216 at a speed which can be controlled and varied to control the gear ratio of the gear. If the drive motor 230 is switched off or held stationary, then the pole piece rotor 216 is held stationary and the coupling operates like the coupling of FIG. 1.

The governing equation of speeds in the magnetic gear 200 is:

$$\omega_i p_i + \omega_o p_o = \omega_p n_p \quad (1)$$

With $\omega_1$, $p_1$ the speed and number of magnetic pole-pairs in the inner rotor 202

$\omega_o$, $p_o$ the speed and number of magnetic pole-pairs in the outer rotor 204

$\omega_p$, $n_p$ the speed of the pole-piece rotor 216 and the number of pole-pieces 206.

When pole-pieces 206 are held stationary ($\omega_p$=0), the relationship between the speeds of the inner rotor 202 and outer rotor 204 is $$\omega_i = -\frac{p_o}{p_i} \omega_o \quad (2)$$

which results in a fixed gear-ratio as in the prior art gear of FIG. 1.

When the speed of the pole-pieces 206 is controlled and variable over a range of speeds, the relationship between the speeds of the inner and outer rotors and the pole piece rotor is $$\omega_i = -\frac{p_o}{p_i} \omega_o + \frac{n_p}{P_i} \omega_p \quad (3)$$

Hence, the gear ratio between the inner rotor 202 and outer rotor 204 can be adjusted by adjusting the speed of the pole-piece rotor 216.

It will be appreciated that the gear can operate in reverse, with the shaft 222 forming the input shaft, the outer rotor 204 forming the input rotor, the shaft 220 forming the output shaft, and the inner rotor 202 forming the output rotor. Indeed, as can be seen from equation (1), anyone of the rotors can be used to control gear ratio between the other two rotors, and hence any two of the rotors can be selected as the input and output rotors with the third acting as the gear ratio control rotor.

Figure 5:
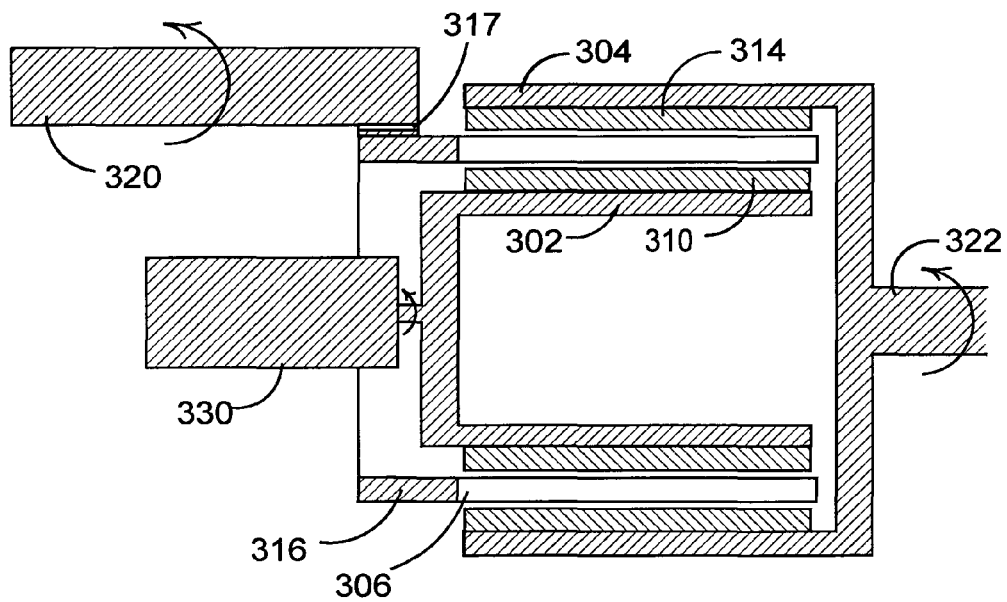
FIG. 5 is a longitudinal section through a drive coupling according to a second embodiment of the invention.

Referring to FIG. 5, in a second embodiment of the invention the spacing of the rotors, magnetic poles and pole pieces is the same as in the first embodiment, and corresponding parts are indicated by the same reference numerals increased by 100. The difference is that in this embodiment, while the outer rotor 304 is again directly connected to the output shaft 322, the pole-piece rotor 316 is connected by a mechanical transmission in the form of drive teeth 317 to the input shaft 320, and the inner rotor 302 is directly connected to the output shaft of the electric motor 330. Therefore in this embodiment the inner rotor 302 forms the gear ratio control rotor, and the pole piece rotor 316 and outer rotor 304 form the input and output rotors.

Figure 6:
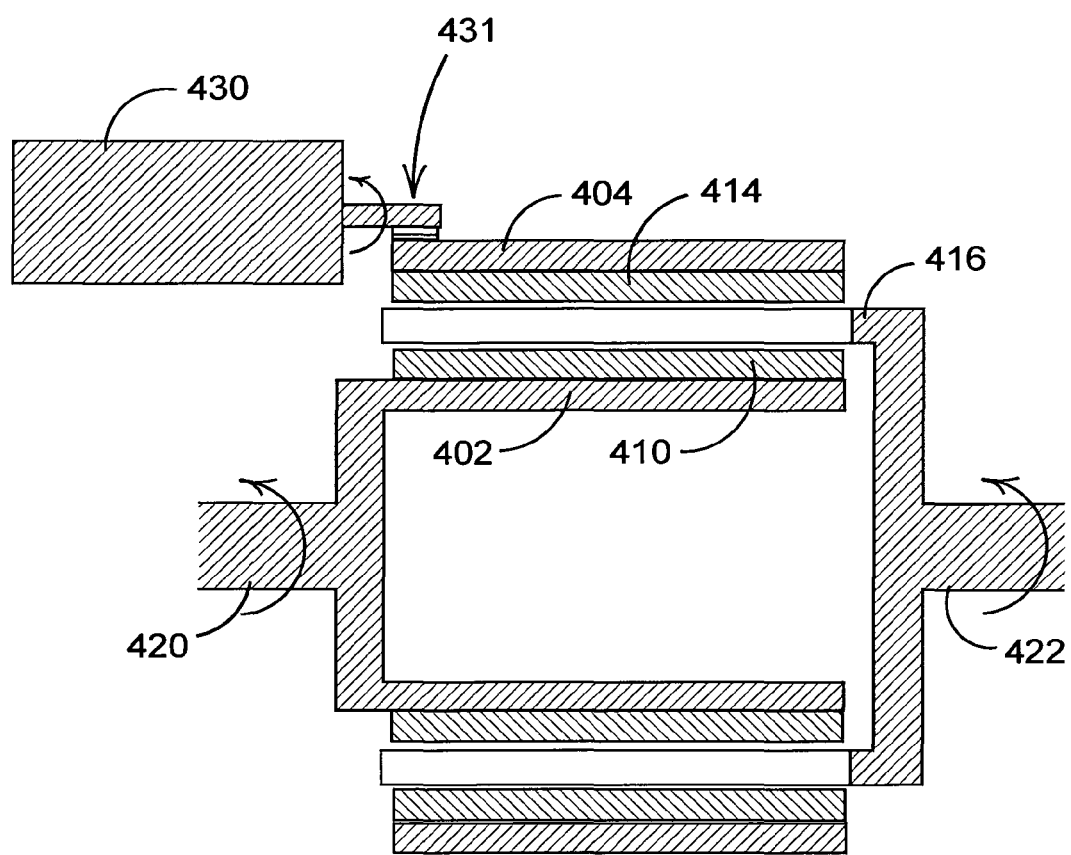
FIG. 6 is a longitudinal section through a drive coupling according to a further embodiment of the invention.

Referring to FIG. 6, in a third embodiment of the invention, the spacing of the rotors, magnetic poles and pole pieces is again the same as in the first embodiment, and corresponding parts are indicated by the same reference numerals as in FIG. 5 again increased by 100. In this embodiment the inner rotor 402 and pole-piece rotor 416 form the input and output rotors and are connected to the input and output shafts 420, 422, and the outer rotor 404 is coupled by a mechanical transmission 431 to the motor 430 and forms the gear ratio control rotor.

The use of an electric motor and a mechanical transmission in the embodiments of FIGS. 4 to 6 are examples of how the speed of the gear ratio control rotor can be controlled, and it will be appreciated that other methods can be used.

Figure 7:
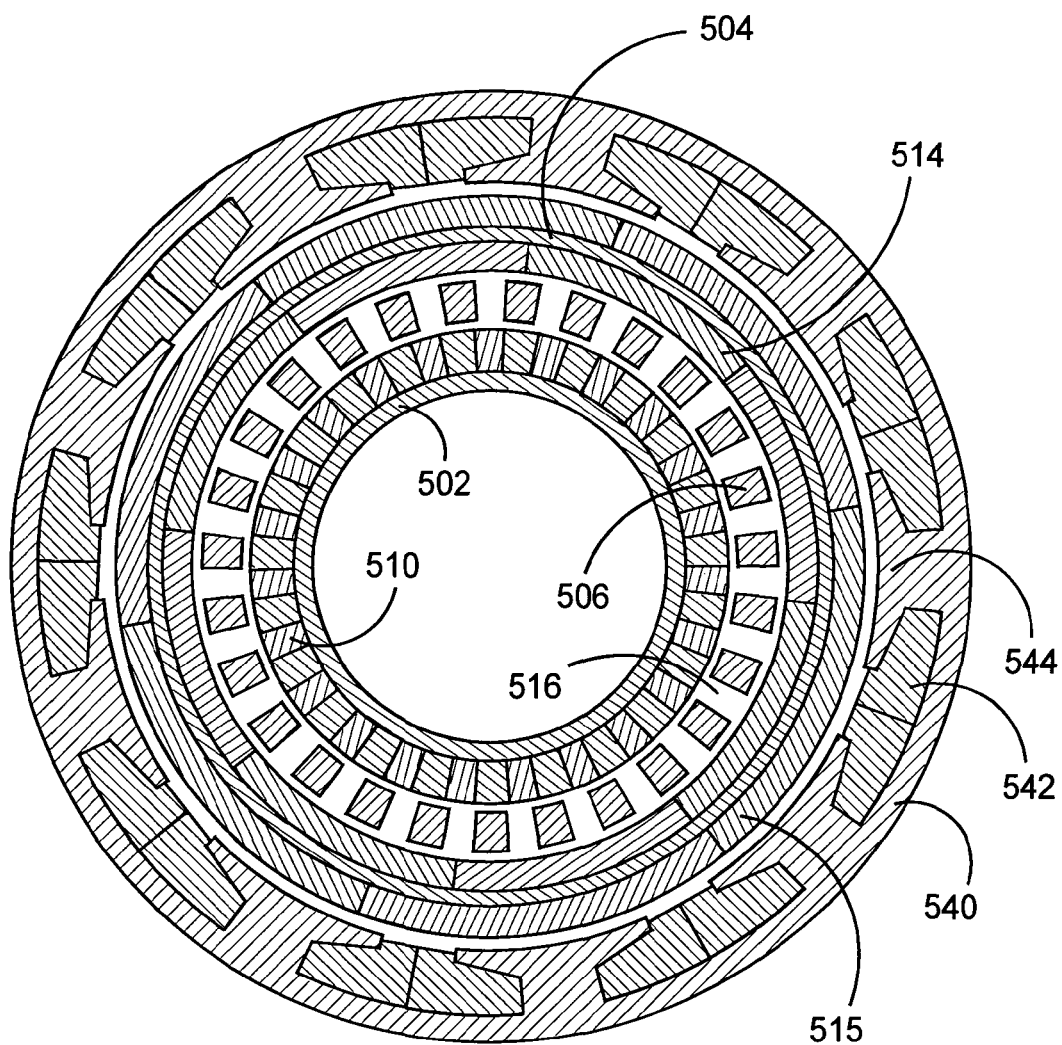
FIG. 7 is a cross section through a drive coupling according to a further embodiment of the invention.

Referring to FIG. 7, in a fourth embodiment of the invention, the inner rotor 502 with its associated set of magnets 510, and the pole-piece rotor 516 carrying the pole pieces 506 form the input and output rotors, and the outer rotor 504 forms the gear ratio control rotor, as in the embodiment of FIG. 6. However, in this case the outer rotor 504 is driven by a permanent magnet electrical machine. To this end, the outer rotor 504 includes an inner array of magnets 514 which cooperate with the pole pieces 506 and the magnets on the inner rotor 502 to provide the gearing, and an outer array of magnets 515 which form part of the 5 permanent magnet electrical machine. A stator 540 is provided radially outside the outer rotor 514, and comprises a series of coils 542 wound on ferromagnetic cores 544. The current flowing in these coils can be controlled to control the driving torque applied to the outer rotor 504 via the outer array of magnets 515. This enables the speed of rotation of the outer rotor 504 to be controlled, and hence the gear ratio of the gear to be varied and controlled.

In this embodiment the outer magnet array 515 has a different number of poles than the inner magnet array 514. It is an advantage of having the two arrays that the gear and the electric motor can be tuned independently of each other.

However, the outer magnet array 515 could have an identical number of poles to the inner array 514. In this case, it is possible to combine both magnet arrays into a single magnet array, which may be held in a non-magnetic holding structure.

Figure 8:
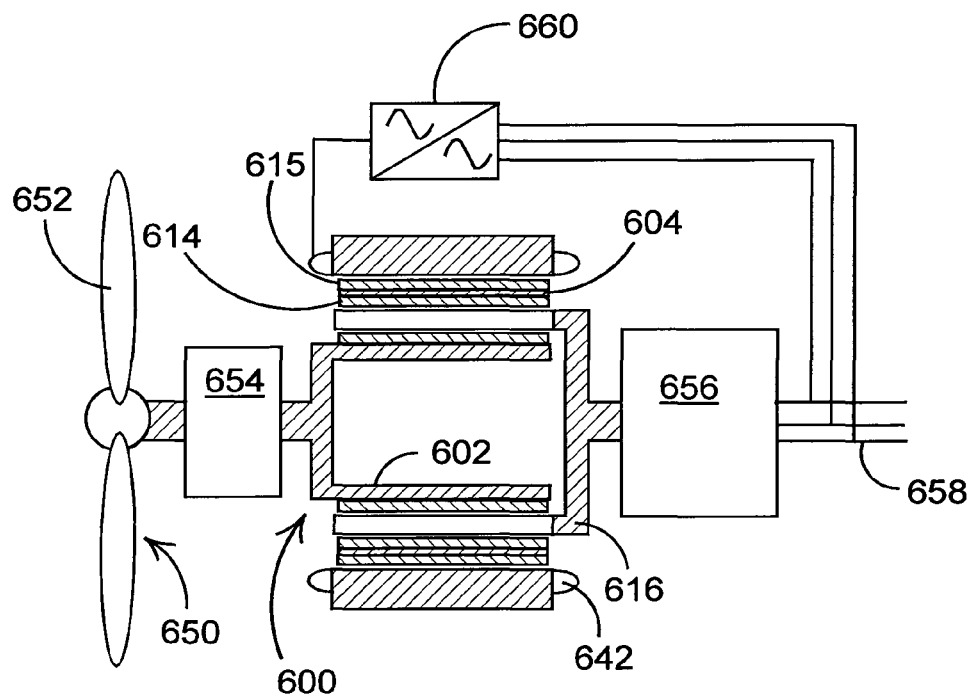
FIG. 8 is a schematic longitudinal section through a power generation system according to a further embodiment of the invention.

Referring to FIG. 8 a further embodiment of the invention comprises a wind turbine generator system. The system comprises a turbine rotor 650 which has a number of blades 652 arranged to be rotated by the wind at variable speed. The turbine rotor 650 is connected via a mechanical transmission 654 to the input rotor 602 of a variable gear ratio magnetic coupling 600 which corresponds to that of FIG. 7 with corresponding parts indicated by the same reference numerals increased by 100. The output rotor 616, of the coupling, which is the pole piece rotor, is connected to a constant speed electrical generator 656 which is directly connected to the three-phase electrical grid 658. The coils 642 of the electrical machine are connected to the electrical grid through a control system 660 which includes a power-electronics converter. The control system 660 is arranged to control the speed of the outer rotor 604, in order to change the gear ratio of the variable gear 600 so that the variable speed of the input rotor 602 is always matched to the constant speed of the output rotor 616. The torque which must be applied on the outer rotor 604 by the electrical machine 642, 615 is governed by the torque on the blades, and is always in an identical direction 5 which does not depend on wind speed. The speed and direction at which the outer rotor 604 is rotated by the electrical machine 642,615 is varied as a function of the wind speed. The control system 660 is thus arranged to take power from the grid 658 to make the electrical machine operate as a motor when it drives the outer, gear ratio controlling, rotor 614 in the same direction to the 10 torque, or to provide power to the grid to make the electrical machine operate as a generator when it drives the outer rotor 614 in the opposite direction to the torque. The electrical machine therefore acts as a motor/generator under the control of the control system 660. The control system includes speed sensors arranged to sense the speed of each of the rotors 602 and 604 to enable it to provide the required speed control.

At the nominal wind speed of the wind turbine, the required gear ratio between the speed of the blades and the speed of the main generator 656 is equal to the nominal gear ratio of the drive train, which results from the combination of the fixed gear and the variable gear with a stationary outer rotor 604. At this wind speed, the motor/generator 642, 615 is controlled to apply a torque on the outer rotor 604 and to keep the outer rotor 604 stationary, and there is no power flow between the motor/generator and the variable gear.

At low wind speeds, the required gear ratio between the speed of the blades 652 and the constant speed of the main generator 656 is greater than the nominal gear ratio of the drive train. Hence, the motor/generator 615/642 is operated to rotate the outer rotor 604 of the variable gear to adjust the overall gear ratio, while the direction of the torque that the motor/generator applies on the outer rotor 604 remains unchanged. Therefore, power is taken from the grid 658 into the electrical machine 615, 642, i.e. the electrical machine 615, 642 in the variable gear 600 operates as a motor. This power then flows through the main electrical generator 656 back into the grid 658. The power through the main electrical generator 656 is greater than the total generated power. At high wind speeds, the required gear ratio between the speed of the blades 652 and the constant speed of the main generator 656 is smaller than the nominal gear ratio of the drive train. The motor/generator 615/642 is operated to rotate the outer rotor 604 of the variable gear to adjust the overall gear ratio in a direction which is opposite to the direction of rotation at low wind speeds, while the direction of the torque that the motor/generator applies on the outer rotor 604 remains unchanged. Therefore, the electrical machine 615, 642 works as a generator. Part of the available wind power flows through the variable gear 600 and its electrical machine into the grid, and the remainder of the available power flows through the main electrical generator 656. The power through the main generator 656 is therefore smaller than the total generated power.

Because at peak power (high wind speed), the motor/generator 615,642 works as a generator and therefore assists the main electrical generator, the main electrical generator 656 can be smaller and cheaper.

This arrangement allows for a constant speed electrical generator 656 to be directly connected to the grid 658, whilst the blades 652 can operate at a speed that maximizes energy capture. Therefore there is no need for power electronics between the electrical generator 656 and the electrical grid 658.

The power needed to control the variable gear 600 depends on the wind speed, but is generally no more than 25% of the power which is generated by the entire turbine 650. The power electronics 660 in the entire system is therefore much smaller than would be required if no variable gear was used. Also, because most of the power does not go through power electronics, the efficiency is high.

It will be understood by those skilled in the art that the motor/generator 642, 615 need not be connected to the grid through a controller 660, but can be connected to a separate external power supply. Such an arrangement could for example be utilized in power generation systems which work in island operation, where the grid is absent at the start of the operation, such that, for example, an additional battery pack or a separate power source is required to operate the electrical machine 615, 642 at start-up. For smaller power generation systems, the electrical machine 615, 642 could be connected to a separate power supply in continuous operation.

Figure 9:
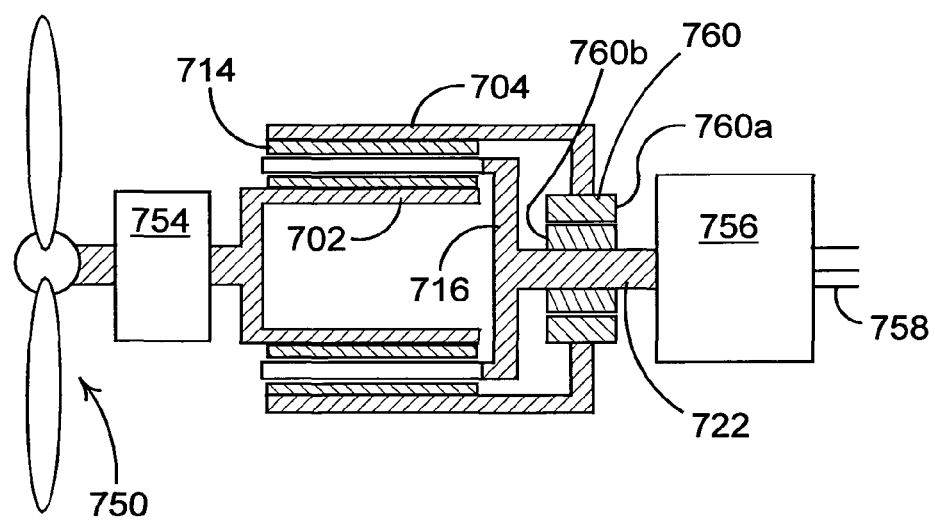
FIG. 9 is a schematic longitudinal section through a power generation system according to a further embodiment of the invention.

Referring to FIG. 9, a further embodiment of the invention is also a wind turbine generator system similar to that of FIG. 8, with corresponding parts indicated by the same reference numerals increased by 100. In this case, the outer rotor 704 only has one set of magnets 714 and the outer rotor 704 is connected to the output shaft 722 by a variable coupling 760 which controls the speed of the outer rotor 704 dependent on the speed of the output shaft 722. The coupling 760 has at least one of its rotors 760a connected to the outer rotor 704 and one of its rotors 760b connected to the output shaft 722. The system further requires speed sensors to detect the speed of the output shaft or input shaft so as to control the variable coupling 760 appropriately and apply the correct feedback.

The coupling is arranged so that a difference in speed between its two rotors 760a and 760b results in torque between these rotors, following a proportional relationship:

$$T = k(om_a - om_b)$$

where
$om_a$ is the speed of the rotor 760a of the coupling which is connected to the outer rotor 704 of the variable gear,
$om_b$, is the speed of the rotor 760h of the coupling which is connected to the output shaft 722, and
k is a characteristic of the coupling.

The coupling is further arranged so that the proportional constant k can be varied, such that the torque between the rotors can be varied for a given speed difference between the rotors 760a and 760b. For example, this could be achieved in an eddy current coupling by altering the mechanical airgap between the rotors 760a and 760b.

The output rotor of the variable gear 716 is connected to the main generator 756 and is controlled to operate at a constant speed, while the input rotor 702 operates at a speed which is a function of the wind speed. Therefore, the speed of the outer rotor of the variable gear, and hence the difference of the speeds between the rotors 760a and 760b of the coupling, are dependent on the wind speed. Further, the torque which is required on the outer rotor 704 of the variable gear is governed by the torque on the blades 750, which is dependent on the wind speed.

The control system aims to find a value k for each wind speed, for which the difference in speed between the rotors of the coupling 760a and 760b generates 20 the required torque on the outer rotor of the variable gear. The generator 756 therefore runs at an approximately constant speed. The coupling 760 can be an eddy-current coupling with adjustable air-gap, or a hydrodynamic torque converter with adjustable vanes on the stator, for example. This coupling feeds back energy in order to keep the output rotor 716 at approximately constant speed.

This system does not require the electrical machine and power electronics of the embodiment of FIG. 8 to drive the outer rotor of the variable gear. Instead the coupling acts as a feedback mechanism, which reacts to a change in speed of the main generator by applying torque on the outer rotor of the variable gear.

The embodiment of the variable gear that is used in FIGS. 8 and 9 only shows one example of the integration of the invention within a power generation system. Any of the embodiments which are previously shown in FIGS. 3 to 7 or the embodiment shown in FIG. 10 can be utilized in the system of FIG. 8.

It will be understood by those skilled in the art that, whereas the embodiments which are shown in FIGS. 8 and 9 are described with reference to power generation from wind energy, other sources of power may be used to apply torque on the main input shaft to generate power, such as fossil fuels in internal and external combustion engines, water energy in wave generators, thermal energy, etc. It will further be understood by those skilled in the art that the embodiment is not limited to power generation, but can be used in any power transmission system where the speed of rotation of the driven member must be de-coupled of the speed of rotation of the driving member. For example, the drive train of a locomotive or a ship which is powered by a diesel engine could employ an arrangement such as shown in FIG. 8 or 9. In this application, the diesel engine would be running at a constant speed, whilst the output shaft rotates at a speed which is a function of the speed of the vehicle. The arrangement would provide the advantage over a direct-drive system that the diesel engine can work at its most optimal constant speed, and only a fraction of the total output power needs to be controlled to provide a variable speed output.

Figure 10:
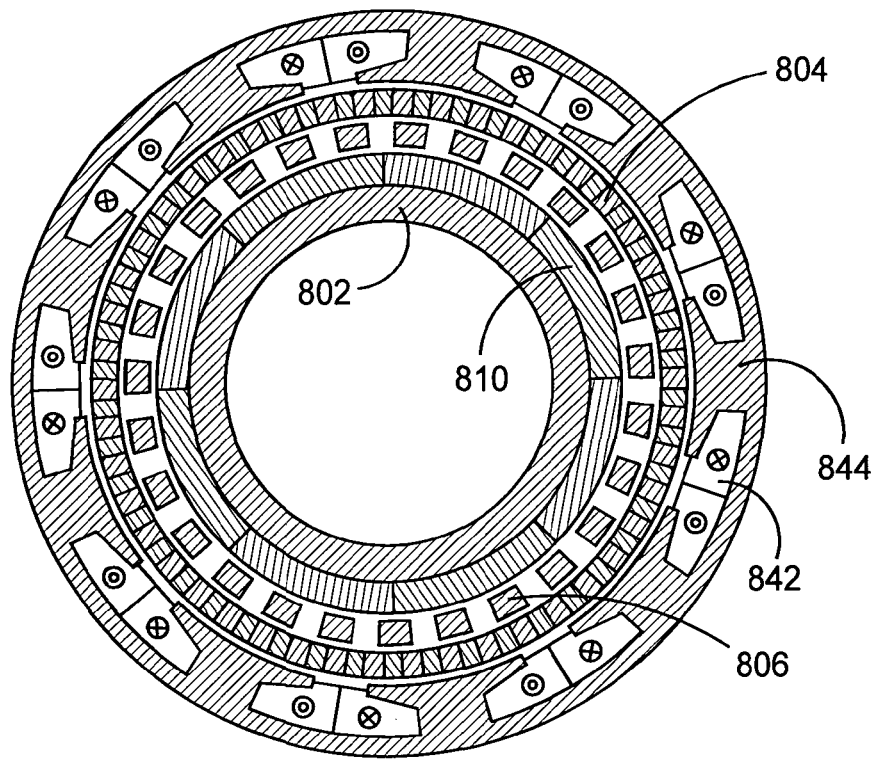
FIG. 10 is a schematic cross section through a drive coupling according to a further embodiment of the invention.
Figure 11:
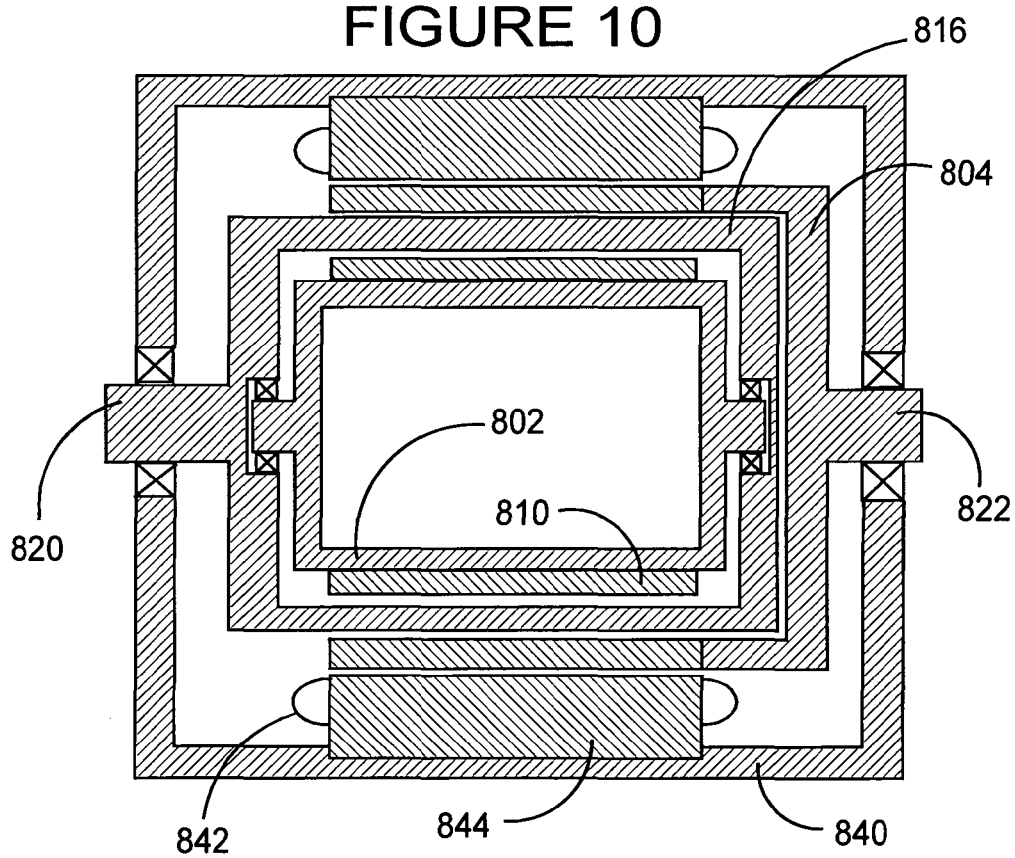
FIG. 11 is a schematic longitudinal section through the drive coupling of FIG. 10.

Referring to FIGS. 10 and 11, a further embodiment of the invention comprises a magnetic gear with the same basic topology as that of FIG. 5. Again, similar parts are indicated by the same reference numerals increased by 500 from those in FIG. 5. The outer rotor 804 is connected to one input/output shaft 822 and the pole piece rotor 816 is connected to the other input/output shaft 820, these two shafts 820, 822 extending out through opposite ends of an outer casing which forms a stator 840. The pole piece rotor 816 is in the form of a closed cylinder and the inner rotor 802 is rotatably supported on bearings inside the inner rotor. The inner rotor 802 therefore cannot be driven mechanically, but is driven magnetically by coils 842 wound on cores 844 on the stator 840. Because the spacing of the magnetic poles of the inner rotor 802 and stator coils 842 is several times greater than the spacing of the magnetic poles of the outer rotor 804 and the pole pieces, the coils can be used to drive the inner rotor 802 without significantly interfering with, or interference from, the outer rotor 804. The outer rotor 804 in this topology carries no back-iron, as this would prevent the flux from the inner magnets 810 from reaching the stator windings 842. Therefore, it is beneficial to arrange the outer magnets in a Halbach array.

Figure 12:
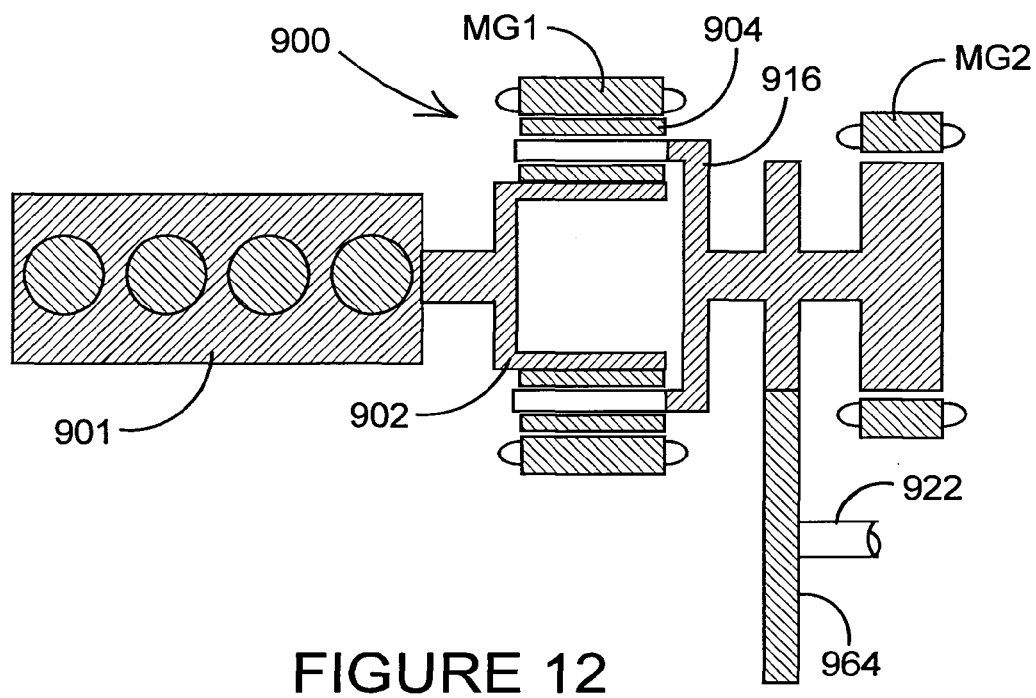
FIG. 12 is a schematic longitudinal section through a vehicle drive train according to a further embodiment of the invention.
Figure 13:
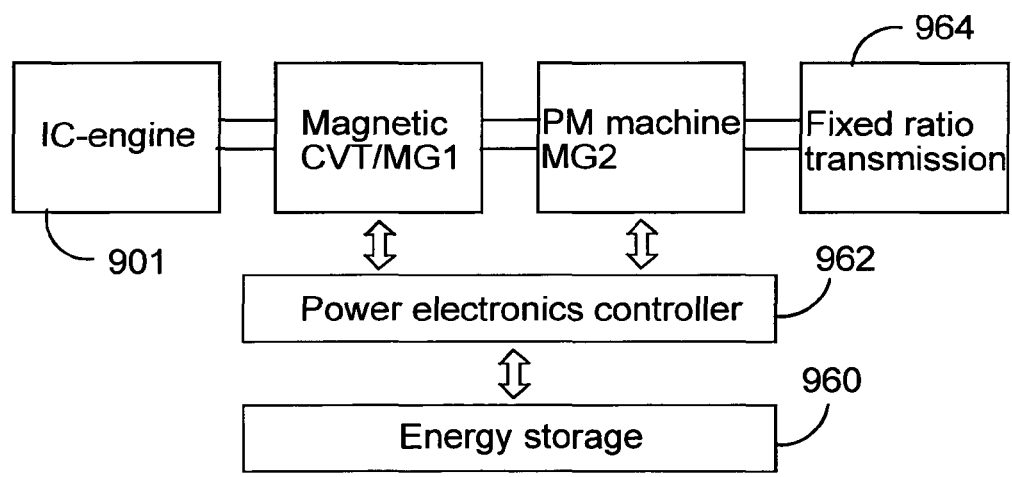
FIG. 13 is a functional diagram of the drive train of FIG. 12.

Referring to FIGS. 12 and 13, in a further embodiment of the invention a down-sized internal combustion (IC) engine 901 is connected to a rotor, in this case the inner rotor 902 of a continuously variable transmission (CVT) in the form of a variable ratio magnetic gear 900, whilst the other two rotors 904, 916 are each coupled to a motor/generator, MG1, and MG2 respectively. Both of the motor/generators MG1, MG2 are interfaced to a high-voltage battery pack 960 via a power electronic converter 962.

The first motor/generator MG1 is integrated within the variable gear 900 and is arranged to drive the outer rotor 904 of the variable gear. The output shaft 922 is coupled to the pole piece rotor 916 via an additional reduction gear unit 964. The second motor/generator is arranged to store energy from the IC engine in the battery pack 960 when the total power output of the IC engine is not being used, and to take power from the battery pack 960 to provide additional torque to the output shaft when the IC engine is not producing sufficient power for the needs of the vehicle.

If MG1 and MG2 are not excited, the drive-train becomes a transmission with a fixed gear-ratio g. If the required traction power at the output of the transmission is $P_d$ ($\omega_d$, $T_d$), ideally the IC engine should operate at its most fuel-efficient point ($\Omega_g$, $T_g$), such that $\Omega_s T_s = P_d$. The corresponding torque and speed at the transmission output with the fixed gear-ratio are ($\Omega_s/g_r$, $g_r T_s$). However, it is likely that they do not match the desired traction speed $\Omega_d$ and torque $T_d$. However, if $T_d > T_s$, $g_r$, then $\Omega_d < \Omega_s/g_r$, and the torque deficit can be met by operating MG2 as a motor, taking power from the energy storage battery. In order to obtain the desired traction speed without varying the IC engine point, operation of MG1 can change the gear ratio such that the resultant speed of the output drive matches. $\Omega_d$. This requires MG1 to operate as a generator, supplying electrical energy to the battery. If the loss in the electrical system is negligible, then the power taken by MG2 is equal to the power supplied by MG1. Hence the net power is zero, and the battery is neither charged nor discharged. Thus, an arbitrary combination of traction torque and speed can be met within the available operating envelope of the ICE by independently controlling the speed of MG1 and the speed of MG2 such that the IC-engine always operates at its most efficient point. If the required traction power is different from that of the IC engine output a similar control strategy can be employed, with the battery being charged or discharged depending on whether the demanded power is less or greater than the IC-output.

The embodiment of the variable gear that is used in FIG. 12 only shows one example of the integration of the invention within the drive train of a hybrid vehicle. Any of the embodiments which are previously shown in FIGS. 3 to 10 can be utilized in the system of FIG. 12.

While in each of the embodiments described above, each of the permanent magnets is a simple dipole with one north and one south pole, it will be appreciate that, while the positioning of the magnetic poles is critical to the operation of each embodiment, any arrangement of pole pairs can be provided by a number of different arrangements of magnets, i.e. blocks of magnetized material. For example more than one pole pair can be provided by a single magnetized block.

In the embodiments described above, the three rotors are all cylindrical, spaced radially from each other. However it will be appreciated that they can be planar and spaced along their common axis of rotation, with the magnets providing flux in an axial direction. Further, the embodiments can also be arranged to operate in a linear manner, in which one translator is used to control the gear ratio between the two other translators.

The invention claimed is:

1. A power train system comprising an engine, an output member, a magnetic gear connecting the engine to the output member, an energy storage system, the power train system arranged to control the flow of power from the engine to the energy storage system or from the energy storage system to the output member if a required power at the output member is different from a power at the engine, wherein the magnetic gear comprises a first rotor having a first set of magnetic poles, a second rotor having a second set of magnetic poles, and a third rotor having a set of pole pieces, the first and second rotors have different numbers of magnetic poles, the pole pieces are arranged to modulate the magnetic field acting between the other two rotors, and the rotation of one of the rotors is controlled so as to vary the gear ratio between the other two rotors, the system further comprising a gear control motor generator operable in a first mode in which it is arranged to take power from the energy storage system to control the gear ratio, and a second mode in which it is arranged to control power transmitted from the engine to the energy storage system to control the gear ratio.

2. A power train system according to claim 1 further comprising a power distribution motor generator arranged to transmit power from the engine to the energy storage system and from the energy storage system to the output member.

3. A power train system as claimed in claim 1 wherein the engine is connected to the first rotor, in this case an inner rotor of the magnetic gear, whilst the second and third rotors, are each coupled to a motor/generator, MG1 and MG2, respectively.

4. A power train system as claimed in claim 3, wherein both of the motor/generators MG1, MG2 are interfaced to an energy storage system via a power electronic converter.

5. A power train system as claimed in claim 4, wherein the motor/generator MG1 is integrated with the magnetic gear and is arranged to drive the second rotor, of the magnetic gear.

6. A power train system as claimed in claim 3, wherein an output shaft is coupled to the third rotor via an additional reduction gear unit.

7. A power train system as claimed in claim 6, wherein the motor/generator MG2 is arranged to permit the storage of energy from the engine in the energy storage system when the total power output of the engine is not being used, and to take power from the energy storage system to provide additional torque to the output shaft when the engine is not producing sufficient power for the needs of a vehicle.

8. A power train system as claimed in claim 1 wherein the engine is connected to the third rotor, the output member is connected to the first rotor, and the second rotor is used to vary the gear ratio between the third rotor and the first rotor.

9. A hybrid vehicle comprising a power train system as claimed in claim 1.

* * * * *